2 Sheets—Sheet 1.

F. A. CANFIELD.
ELECTRIC FUSE.

No. 169,622. Patented Nov. 9, 1875.

Witnesses:
Jno R Lefferts
John McCrone

Inventor:
Fred'k A. Canfield

F. A. CANFIELD.
ELECTRIC FUSE.
No. 169,622.
2 Sheets—Sheet 2.
Patented Nov. 9, 1875.
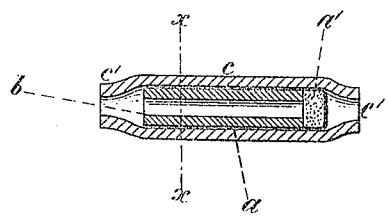
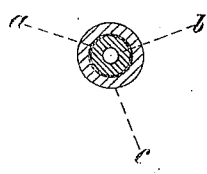
Witnesses:
Inventor:

UNITED STATES PATENT OFFICE.

FREDERICK A. CANFIELD, OF DOVER, NEW JERSEY.

IMPROVEMENT IN ELECTRIC FUSES.

Specification forming part of Letters Patent No. 169,622, dated November 9, 1875; application filed August 28, 1875.

*To all whom it may concern:*

Be it known that I, FREDERICK A. CANFIELD, of Dover, in the county of Morris and State of New Jersey, have invented a new and useful Improvement in the Protection of Electric Exploders for Mines, which improvement is fully set forth in the following specification, reference being had to the accompanying drawings.

Exploders for mines and subaqueous work are very liable to difficulty arising from the water necessarily found in mines, and from the carelessness of miners in exposing these exploders to it, either before or after their entrance into the exploding cavity. A very small amount of water renders these exploders entirely useless, and a single drop of water will sometimes destroy the effect of a connected series of blasts—as, for instance, when several exploders are connected with one electrical machine, and situated in different blast-tubes, if one of them fails to act properly the best effect of the blast will certainly be lost, and much difficulty may arise.

My invention is designed to protect these exploders from the influence of the water, so that they will act equally well in water or air. The usual copper exploder, containing fulminate at one end, is used. Into this is slipped a tightly-fitting tube of rubber, so as to make a water-tight joint between it and the surrounding copper. The wires carrying the electricity are passed through the central tube, and brought in contact with the fulminate, or they may be allowed to enter it slightly. I usually place fulminate of mercury in the bottom of the exploder. Fulminate of silver is dropped upon the fulminate of mercury, and the wires placed in position, so that they slightly enter this fulminate of silver. Surrounding the wires I place a plug of some soft elastic material, such as gutta-percha or india-rubber, so arranged that it will completely close the entrance to the rubber tube, so that when the wires are in position the entering plug and its surrounding india-rubber tube make a water-tight joint and protect the fulminate entirely from the surrounding water.

The entering wires might both be inclosed in one covering, and, if this is of such a size as exactly to fit the india-rubber tube, no closing-plug would be necessary.

This exploder may also be externally protected by another elastic tube, as described in the patent heretofore granted me for protecting exploders.

Figure 1:
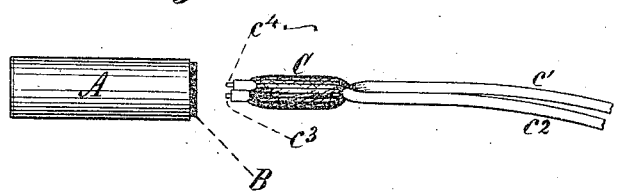
Figure 2:
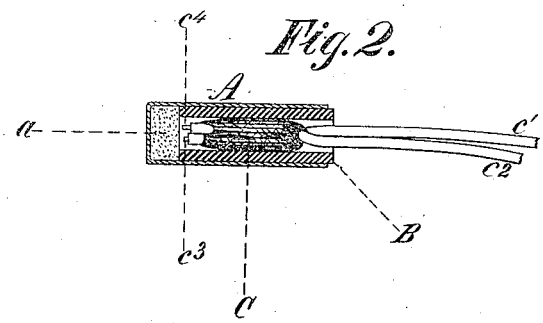

In the accompanying drawings, Figures 1, 2, 3, and 4 show the details of my apparatus. Fig. 1 is a general view of the whole; Fig. 2, the longitudinal cross section. Figs. 3 and 4 show my apparatus lined within and without with the protecting material. Fig. 3 is a cross-section of Fig. 4 on the line $x\,x$. Fig. 4 is a longitudinal cross-section, showing the india-rubber tube, as described in my patent for explosive caps.

In Figs. 3 and 4, $a$ is the metal exploder. $c$ $c^1$ is the external, and $b$ is the internal, rubber tube; A, Figs. 1 and 2, the copper exploder or cap, with its fulminate $a$. B is the water-proof rubber tube, and C the plug surrounding the conducting-wires $c^1$ and $c^2$, and preventing the access of water to the fulminate $a$.

The rubber tube B might extend to the bottom of the metallic tube $a$, so as to protect the fulminate within from explosion by concussion.

Before the wires $c^1$ and $c^2$ are in position a plug of rubber or other material serves to close the entrance to the tube B.

By means of my invention the expensive and complicated electrical exploders now in use may be dispensed with, and the same exploders used for firing by electricity, as is now used for firing by fuse; and this exploder, moreover, may be rendered perfectly safe from any danger arising from the presence of water.

These exploders might also be advantageously employed in the electric firing of large cannon or field-pieces.

What I claim as my invention, and desire to secure by Letters Patent, is—

1. The exploder A, lined with rubber or other similar material, substantially as described.

2. The combination of the rubber-lined metallic exploder A with the entering conducting-wires $c^1$ and $c^2$, so arranged as to render it water-proof, substantially as described.

3. An exploder covered within and without with elastic material, for the purpose of rendering it safe from explosion by concussion, and at the same time protecting it from the influence of water, substantially as described.

FREDK. A. CANFIELD.

Witnesses:
JOHN McCRONE,
JNO. E. LEFFERTS.